UNITED STATES PATENT OFFICE.

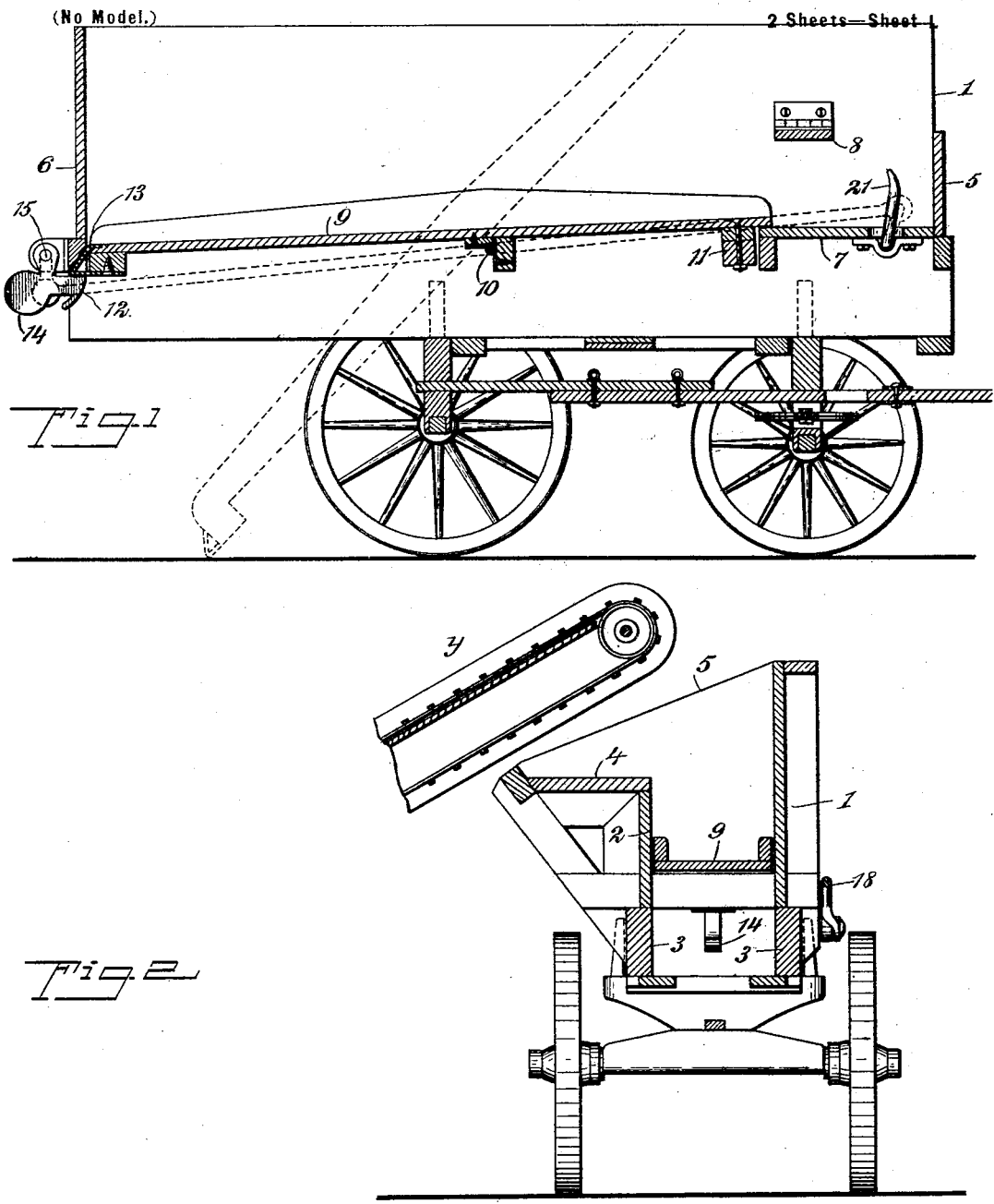

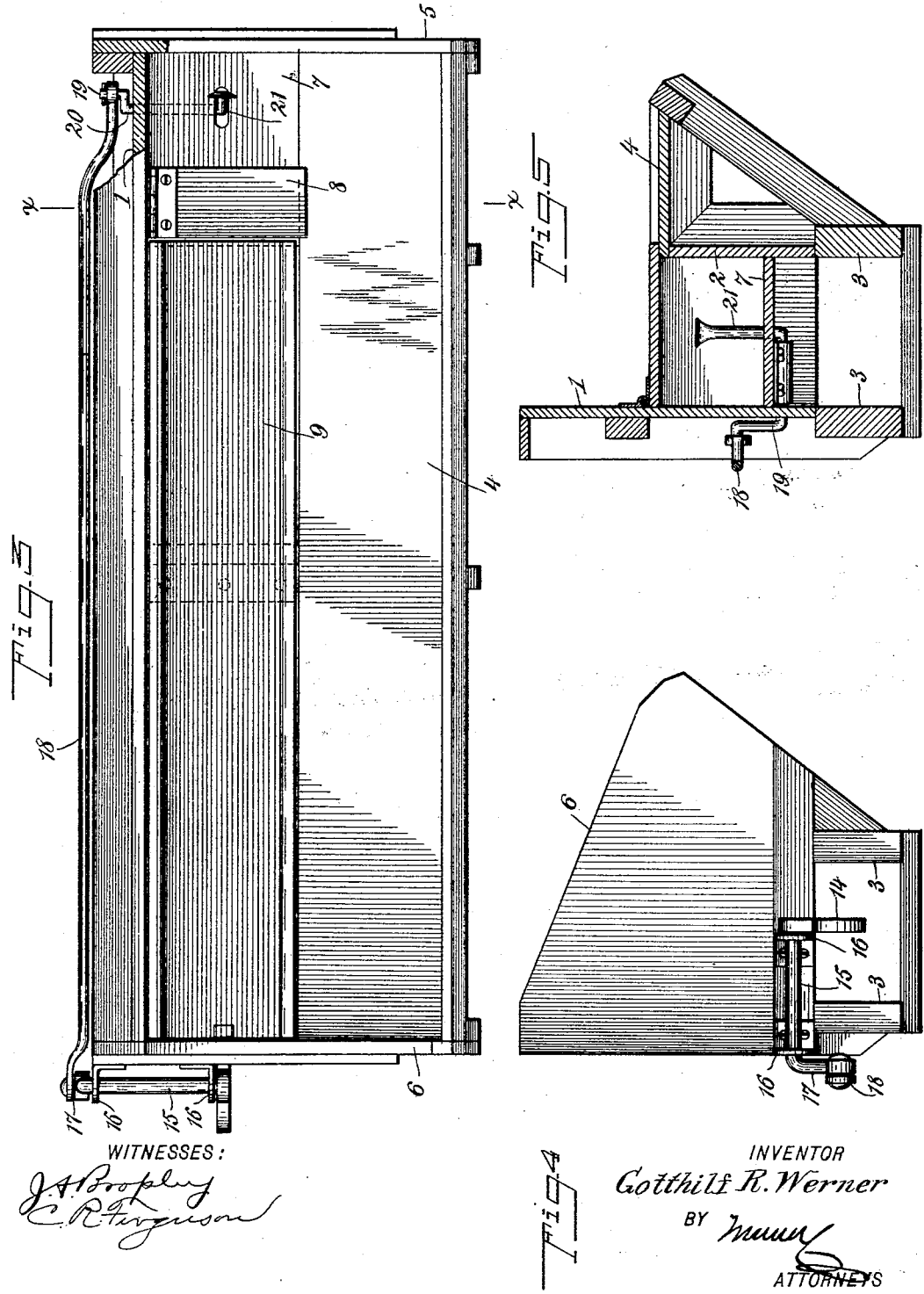

GOTTHILF R. WERNER, OF COLBY, KANSAS, ASSIGNOR OF ONE-HALF TO FRANK A. LOUIS, OF COLBY, KANSAS.

DUMPING-VEHICLE.

SPECIFICATION forming part of Letters Patent No. 710,909, dated October 7, 1902.

Application filed March 25, 1902. Serial No. 99,898. (No model.)

*To all whom it may concern:*

Be it known that I, GOTTHILF R. WERNER, a citizen of the United States, and a resident of Colby, in the county of Thomas and State of Kansas, have invented a new and Improved Dumping-Vehicle, of which the following is a full, clear, and exact description.

This invention relates to improvements in dumping-vehicles, particularly vehicles to be used in conjunction with a grain-header, the object being to provide a device of this character which will operate to dump the grain on the ground in even rows, so that the grain will be in convenient shape for drying out, so that it can be stacked.

I will describe a dumping-vehicle embodying my invention and then point out the novel features in the appended claims.

Reference is to be had to the accompanying drawings, forming a part of this specification, in which similar characters of reference indicate corresponding parts in all the figures.

Figure 1 is a longitudinal sectional view of a dumping-vehicle embodying my invention. Fig. 2 is a cross-section thereof. Fig. 3 is a plan view. Fig. 4 is a rear end view, and Fig. 5 is a section on the line $xx$ of Fig. 3.

The body of the vehicle comprises side-boards 1 2, mounted on stringers 3, designed to rest on the bolsters of a wagon. The side-board 1 is somewhat higher than the side 2, so that said higher side-board acts to protect the grain deposited in the body from the wind. Extended outward from the top of the side-board 2 is a platform 4, and connected to said platform and to the side-boards are the end-boards 5 and 6. In the forward portion of the body is a platform 7, above which is the driver's seat 8. As here shown, the seat 8 is hinged to the side-board 1, so that it may be readily swung upward when not desired for use.

Mounted to swing in the body is a dumping-platform or bottom 9, the pivotal point 10 of which is somewhat forward of the center, so that the weight of grain on the rear end will cause a swinging movement of the dumping-platform when desired. After dumping the platform will be returned to normal position by means of a weight 11 on its forward end. The dumping-platform is held in normal position by a latch 12, engaging with a metal shoe 13, attached to the rear end of the platform. The forward end of the latch 12 is curved upward and forward, and the end of the shoe 13 is reversely curved, so that upon an upward movement of the platform 9 it will move the latch rearward until the platform reaches its position, when the latch will move into engagement with the shoe. These movements of the latch will be caused by its counterbalanced or weighted end 14.

The latch is mounted on a shaft 15, having bearings in brackets 16 on the rear end of the body, and on the outer end of the shaft is a crank 17, from which a rod 18 extends along the outer side of the body and connects at its forward end with the crank 19 of a shaft 20, extending underneath the body, and having a portion 21 projected upward through an opening in the platform 7 in easy reach of the foot of the driver.

In operation the vehicle is to be drawn along at one side of a harvester or header, and the cut grain is carried by the conveyer $y$ and dumped in the body upon the dumping-platform. At suitable intervals the driver by pushing forward on the upward projection 21 of the shaft 20 will tilt the latch 12 to release the platform 9, and then the weight of the material will tilt the platform and the material will slide off in rows, so that it may be conveniently gathered up for binding. After the dumping, as before stated, the weight 11 will return the platform to its normal position.

While I have described the device as particularly adapted for dumping grain, it is obvious that it may be used for other purposes—such, for instance, as distributing fertilizer.

Having thus described my invention, I claim as new and desire to secure by Letters Patent—

1. A dumping-vehicle comprising a body, a fixed platform in the forward end thereof, a tilting platform, a locking device for holding the tilting platform in normal position, a shaft extended underneath the fixed platform and having a portion projected through an opening therein, and a connection between said shaft and the locking device, substantially as specified.

2. A dumping-vehicle comprising a body, a fixed platform in the forward end of the body, a swinging platform or bottom, a latch for engaging with the rear end of the swinging platform, the said latch being counterbalanced, a shaft on which the latch is mounted, a crank on the shaft, a shaft at the forward portion of the body and having a portion extended through the fixed platform, a crank on said last-named shaft, and a connection between the two cranks, substantially as specified.

3. A dumping-vehicle comprising a body, a dumping-platform in the body, the pivotal point of said platform being forward of its center, a weight on the forward end of the platform, a locking device for engaging with the rear end of the dumping-platform, and means adapted to be operated by a driver for releasing the locking device, substantially as specified.

4. A dumping-vehicle comprising a body having opposite side-boards, one of said side-boards being higher than the other, a platform extended outward from the lower side-board, and a swinging platform or bottom in the body, substantially as specified.

In testimony whereof I have signed my name to this specification in the presence of two subscribing witnesses.

GOTTHILF R. WERNER.

Witnesses:
CHARLES SCHERER,
J. B. LAMPTON.